United States Patent
Greenstein et al.

(10) Patent No.: US 11,656,472 B2
(45) Date of Patent: May 23, 2023

(54) HEAD-MOUNTED AUGMENTED REALITY DEVICE EMPLOYING AN OPTICAL BENCH

(71) Applicant: Lumus Ltd., Ness Ziona (IL)

(72) Inventors: Yaakov Greenstein, Jerusalem (IL); Uri Shultz, Petach Tikvah (IL); Shmuel Friedman, Ness Ziona (IL)

(73) Assignee: LUMUS LTD., Ness Ziona (IL)

( * ) Notice: Subject to any disclaimer, the term of this patent is extended or adjusted under 35 U.S.C. 154(b) by 385 days.

(21) Appl. No.: 16/758,109

(22) PCT Filed: Oct. 22, 2018

(86) PCT No.: PCT/IL2018/051127
§ 371 (c)(1),
(2) Date: Apr. 22, 2020

(87) PCT Pub. No.: WO2019/077614
PCT Pub. Date: Apr. 25, 2019

(65) Prior Publication Data
US 2020/0278557 A1    Sep. 3, 2020

Related U.S. Application Data

(60) Provisional application No. 62/575,477, filed on Oct. 22, 2017.

(51) Int. Cl.
*G02B 27/14* (2006.01)
*G02B 27/01* (2006.01)

(52) U.S. Cl.
CPC ..... *G02B 27/0176* (2013.01); *G02B 27/0172* (2013.01); *G02B 27/0179* (2013.01);
(Continued)

(58) Field of Classification Search
CPC ............ G02B 27/0176; G02B 27/0172; G02B 27/0179; G02B 2027/0132
(Continued)

(56) References Cited

U.S. PATENT DOCUMENTS 3,969,023 A    7/1976   Brandt et al.
4,720,189 A    1/1988   Heynen et al.
(Continued)

FOREIGN PATENT DOCUMENTS

CN    106054292      10/2016
CN    207216158 U    4/2018
(Continued)

OTHER PUBLICATIONS

Wei Chen et al.; "An Image Quality Evaluation Method of Near-eye Display" in 1060 • SID Symposium Digest of Technical Papers, vol. 47,No. 1,May 1, 2016, pp. 1060-1063, XP 0554411041,US.

*Primary Examiner* — Jonathan M Blancha
(74) *Attorney, Agent, or Firm* — Mark M. Friedman

(57) ABSTRACT

A head-mounted augmented reality device (10) includes a pair of optical modules (12) for the right and left eyes of the user, each having a collimating display source (14) optically coupled to a light guide (16) for directing image illumination towards an eye of the user. A support structure (20) is supported by the head of the user. An optical bench (22) provides a first set of alignment features (26, 28, 32, 74) for aligning and affixing the right optical module and a second set of alignment features (26, 28, 32, 74) for aligning and affixing the left optical module. A suspension arrangement suspends the optical bench relative to the support structure. The optical bench (22) provides the sole mechanical connection between the pair of optical modules (12) and the support structure (20).

13 Claims, 10 Drawing Sheets

(52) U.S. Cl.
CPC ............... *G02B 2027/0132* (2013.01); *G02B 2027/0163* (2013.01); *G02B 2027/0181* (2013.01)

(58) Field of Classification Search
USPC ........................................................ 359/630
See application file for complete search history.

(56) References Cited

U.S. PATENT DOCUMENTS

| | | | |
|---|---|---|---|
| 6,239,771 B1* | 5/2001 | Usuki | G02B 27/017 340/980 |
| 6,879,443 B2 | 4/2005 | Spitzer et al. | |
| 7,612,879 B2 | 11/2009 | Stumpe et al. | |
| 7,724,409 B2 | 5/2010 | Lin et al. | |
| 8,016,428 B2 | 9/2011 | Kasazumi et al. | |
| 9,311,883 B2 | 4/2016 | Cajigas et al. | |
| 9,569,897 B2 | 2/2017 | Miyawaki et al. | |
| 9,638,920 B2 | 5/2017 | Bohn | |
| 2002/0186179 A1 | 12/2002 | Knowles | |
| 2003/0165017 A1 | 9/2003 | Amitai | |
| 2004/0032660 A1 | 2/2004 | Amitai | |
| 2004/0033528 A1 | 2/2004 | Amitai | |
| 2004/0080718 A1 | 4/2004 | Kojima | |
| 2004/0212775 A1 | 10/2004 | Hunter et al. | |
| 2005/0078388 A1 | 4/2005 | Amitai | |
| 2005/0083592 A1 | 4/2005 | Amitai | |
| 2005/0180687 A1 | 8/2005 | Amitai | |
| 2005/0281515 A1 | 12/2005 | Togami | |
| 2007/0091445 A1 | 4/2007 | Amitai | |
| 2007/0097513 A1 | 5/2007 | Amitai | |
| 2007/0155277 A1 | 7/2007 | Amitai | |
| 2007/0165192 A1 | 7/2007 | Prior | |
| 2008/0025667 A1 | 1/2008 | Amitai | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0192239 A1 | 8/2008 | Otosaka | |
| 2008/0198471 A1 | 8/2008 | Amitai | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2009/0180194 A1 | 7/2009 | Yamaguchi et al. | |
| 2010/0077049 A1 | 3/2010 | Appelman | |
| 2010/0171680 A1 | 7/2010 | Lapidot et al. | |
| 2010/0202048 A1 | 8/2010 | Amitai | |
| 2010/0214635 A1 | 8/2010 | Sasaki et al. | |
| 2011/0050547 A1 | 3/2011 | Mukawa | |
| 2011/0176218 A1 | 7/2011 | Noui | |
| 2011/0304828 A1 | 12/2011 | Khechana | |
| 2012/0179369 A1 | 7/2012 | Lapidot et al. | |
| 2013/0022220 A1* | 1/2013 | Dong | H04R 1/028 381/151 |
| 2013/0229717 A1 | 9/2013 | Amitai | |
| 2013/0276960 A1 | 10/2013 | Amitai | |
| 2013/0279017 A1 | 10/2013 | Amitai | |
| 2014/0027232 A1 | 1/2014 | Mccollum | |
| 2014/0014065 A1 | 5/2014 | Brown et al. | |
| 2014/0118813 A1 | 5/2014 | Amitai et al. | |
| 2014/0118836 A1 | 5/2014 | Amitai et al. | |
| 2014/0118837 A1 | 5/2014 | Amitai et al. | |
| 2014/0126051 A1 | 5/2014 | Amitai et al. | |
| 2014/0126052 A1 | 5/2014 | Amitai et al. | |
| 2014/0126056 A1 | 5/2014 | Amitai et al. | |
| 2014/0126057 A1 | 5/2014 | Amitai et al. | |
| 2014/0126175 A1 | 5/2014 | Amitai et al. | |
| 2015/0070864 A1* | 3/2015 | Rainer | H05K 1/0393 438/126 |
| 2015/0138451 A1 | 5/2015 | Amitai | |
| 2015/0198805 A1 | 7/2015 | Mansharof et al. | |
| 2015/0205140 A1 | 7/2015 | Mansharof et al. | |
| 2015/0205141 A1 | 7/2015 | Mansharof et al. | |
| 2015/0233824 A1 | 8/2015 | Richards et al. | |
| 2015/0277127 A1 | 10/2015 | Amitai | |
| 2015/0293360 A1 | 10/2015 | Amitai | |
| 2015/0035481 A1 | 12/2015 | Hilkes et al. | |
| 2015/0355481 A1* | 12/2015 | Hilkes | G02C 5/126 351/227 |
| 2016/0012643 A1 | 1/2016 | Kezele et al. | |
| 2016/0062119 A1 | 3/2016 | Fitch et al. | |
| 2016/0116743 A1 | 4/2016 | Amitai | |
| 2016/0170212 A1 | 6/2016 | Amitai | |
| 2016/0170213 A1 | 6/2016 | Amitai | |
| 2016/0170214 A1 | 6/2016 | Amitai | |
| 2016/0187656 A1 | 6/2016 | Amitai | |
| 2016/0020965 A1 | 7/2016 | Popovich et al. | |
| 2016/0278695 A1* | 9/2016 | Wang | G02B 23/2484 |
| 2016/0314564 A1 | 10/2016 | Jones | |
| 2016/0341964 A1 | 11/2016 | Amitai | |
| 2016/0349518 A1 | 12/2016 | Amitai et al. | |
| 2017/0003504 A1 | 1/2017 | Vallius | |
| 2017/0045744 A1 | 2/2017 | Amitai | |
| 2017/0052376 A1 | 2/2017 | Amitai | |
| 2017/0052377 A1 | 2/2017 | Amitai | |
| 2017/0122725 A1 | 5/2017 | Yeoh | |
| 2017/0146802 A1 | 5/2017 | Pletenetskyy | |
| 2017/0169747 A1 | 6/2017 | Richards et al. | |
| 2017/0205277 A1 | 7/2017 | Ohtsuki | |
| 2017/0307896 A1* | 10/2017 | Kovaluk | G06T 19/006 |
| 2017/0336636 A1 | 11/2017 | Amitai et al. | |
| 2017/0353714 A1 | 12/2017 | Poulad et al. | |
| 2017/0357095 A1 | 12/2017 | Amitai | |
| 2017/0363799 A1 | 12/2017 | Ofir et al. | |
| 2017/0363885 A1* | 12/2017 | Blum | G03B 13/10 |
| 2018/0039082 A1 | 2/2018 | Amitai | |
| 2018/0067315 A1 | 3/2018 | Amitai et al. | |
| 2018/0130391 A1* | 5/2018 | Bohn | G02B 27/0172 |
| 2018/0157057 A1 | 6/2018 | Gelberg et al. | |
| 2018/0210202 A1 | 7/2018 | Danziger | |
| 2018/0267317 A1 | 9/2018 | Amitai | |
| 2018/0275384 A1 | 9/2018 | Danziger et al. | |
| 2018/0292592 A1 | 10/2018 | Danziger | |
| 2018/0292599 A1 | 10/2018 | Ofir et al. | |
| 2018/0373039 A1 | 12/2018 | Amitai | |
| 2019/0011710 A1 | 1/2019 | Amitai | |
| 2019/0056600 A1 | 2/2019 | Danziger et al. | |
| 2019/0064518 A1 | 2/2019 | Danziger | |
| 2019/0068944 A1* | 2/2019 | Zhang | G02B 27/0176 |
| 2019/0155035 A1 | 5/2019 | Amitai | |
| 2019/0159354 A1* | 5/2019 | Zheng | G02B 27/01 |
| 2019/0170327 A1 | 6/2019 | Eisenfeld et al. | |
| 2019/0208187 A1 | 7/2019 | Danziger | |
| 2019/0212487 A1 | 7/2019 | Danziger et al. | |
| 2019/0227215 A1 | 7/2019 | Danziger et al. | |
| 2019/0278086 A1 | 9/2019 | Ofir | |
| 2019/0285900 A1 | 9/2019 | Amitai | |
| 2019/0293856 A1 | 9/2019 | Danziger | |
| 2019/0339530 A1 | 11/2019 | Amitai | |
| 2019/0346609 A1 | 11/2019 | Eisenfeld | |
| 2019/0361240 A1 | 11/2019 | Gelberg | |
| 2019/0361241 A1 | 11/2019 | Amitai | |
| 2019/0377187 A1 | 12/2019 | Rubin et al. | |
| 2019/0391408 A1 | 12/2019 | Mansharof | |
| 2020/0033572 A1 | 1/2020 | Danziger et al. | |
| 2020/0041713 A1 | 2/2020 | Danziger | |
| 2020/0089001 A1 | 3/2020 | Amitai et al. | |
| 2020/0110211 A1 | 4/2020 | Danziger et al. | |
| 2020/0120329 A1 | 4/2020 | Danziger | |
| 2020/0133008 A1 | 4/2020 | Amitai | |
| 2020/0150330 A1 | 5/2020 | Danziger et al. | |
| 2020/0183159 A1 | 6/2020 | Danziger | |
| 2020/0183170 A1 | 6/2020 | Amitai et al. | |
| 2020/0200963 A1 | 6/2020 | Eisenfeld et al. | |
| 2020/0209667 A1 | 7/2020 | Sharlin et al. | |
| 2020/0241308 A1 | 7/2020 | Danziger et al. | |
| 2020/0249481 A1 | 8/2020 | Danziger et al. | |
| 2020/0278557 A1 | 9/2020 | Greenstein et al. | |
| 2020/0285060 A1 | 9/2020 | Amitai | |
| 2020/0292417 A1 | 9/2020 | Lobachinsky et al. | |
| 2020/0292744 A1 | 9/2020 | Danziger | |

(56) References Cited

U.S. PATENT DOCUMENTS

| | | |
|---|---|---|
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0239898 A1 | 8/2021 | Danziger et al. |

FOREIGN PATENT DOCUMENTS

| | | |
|---|---|---|
| JP | H09101479 A | 4/1997 |
| JP | 2001021448 | 1/2001 |
| JP | 2008035146 | 2/2008 |
| JP | 2008134471 | 6/2008 |
| JP | 2013231652 | 11/2013 |
| WO | WO2018023903 A1 * | 8/2018 |

* cited by examiner

FIG. 2
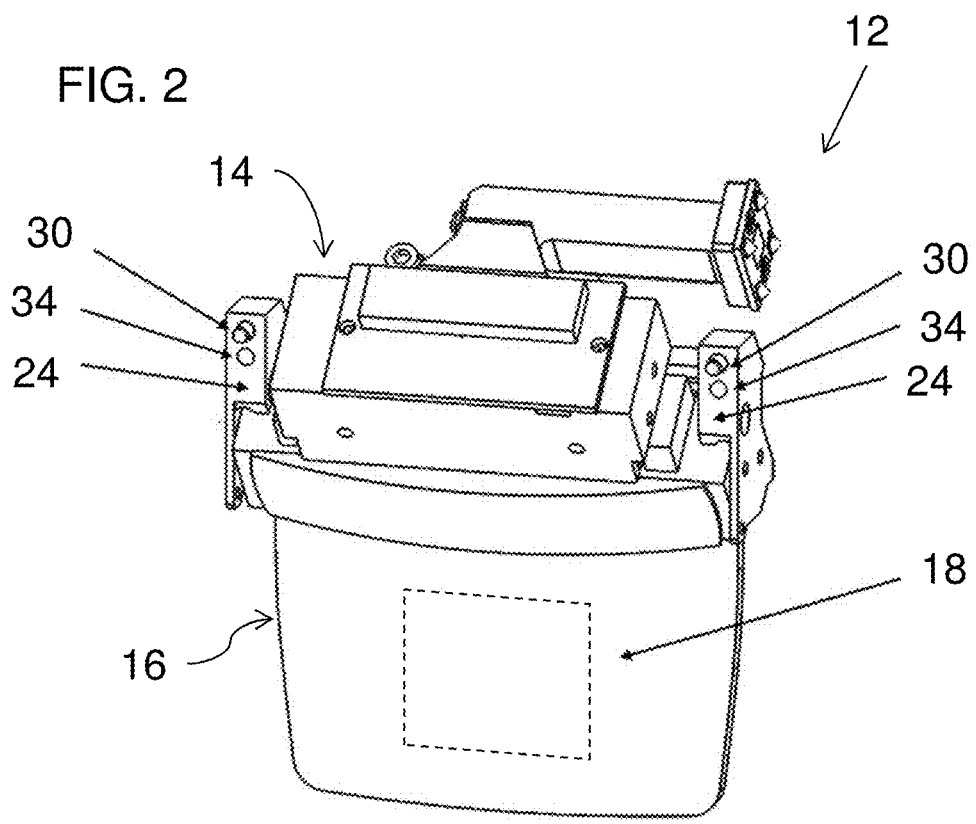
FIG. 3A
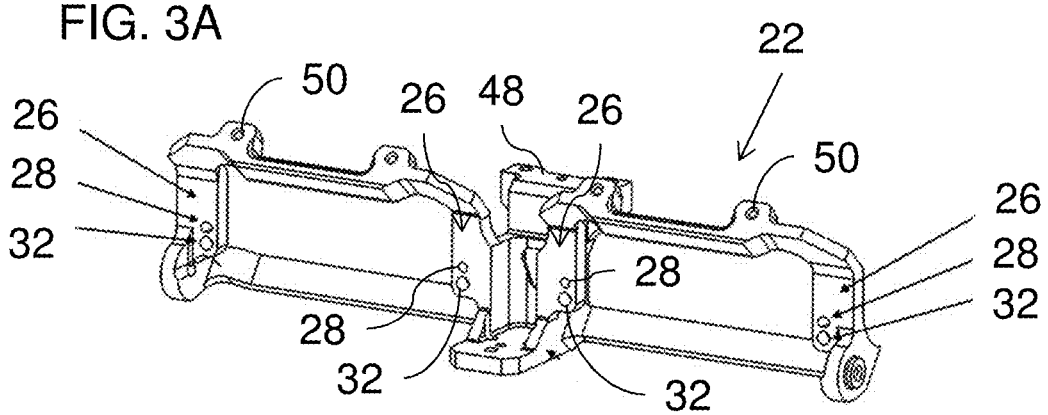
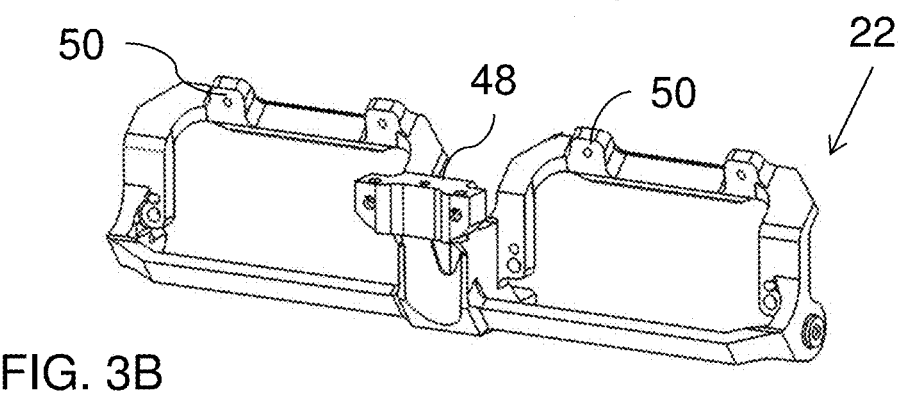
FIG. 3B

FIG. 9A
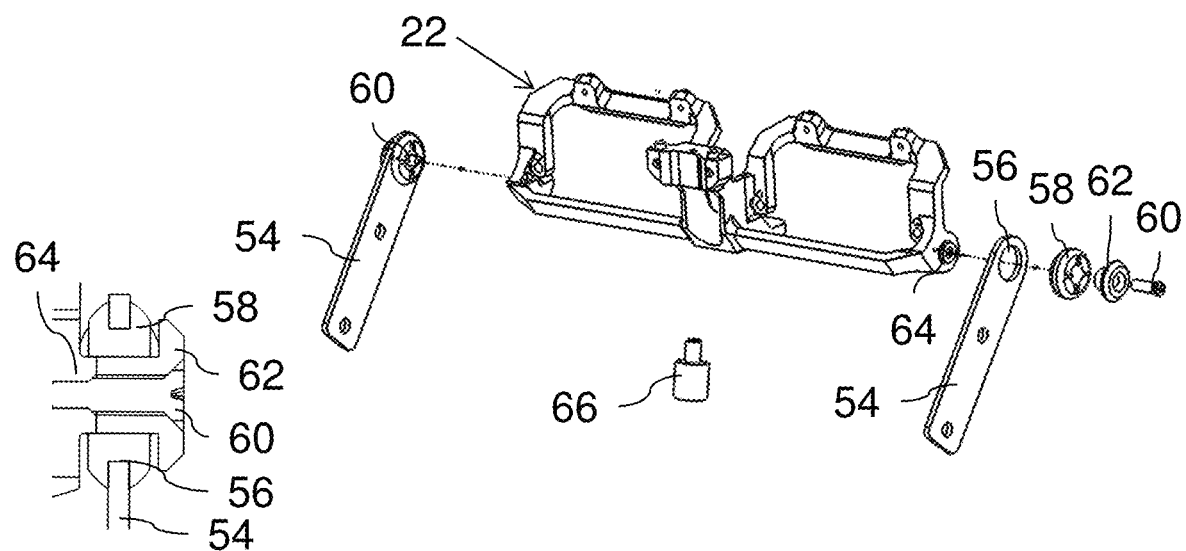
FIG. 9B
FIG. 10
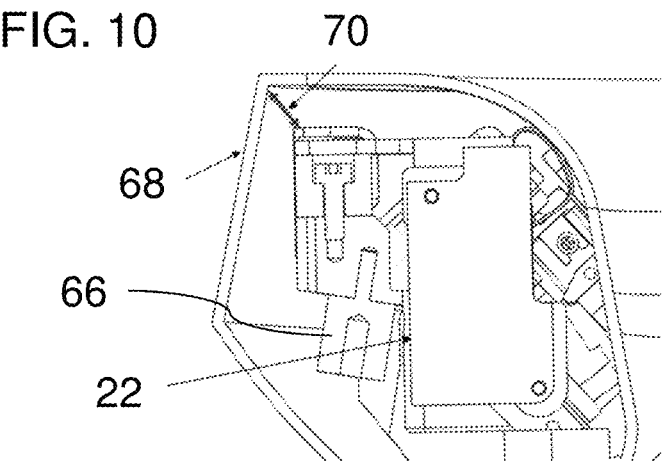

HEAD-MOUNTED AUGMENTED REALITY DEVICE EMPLOYING AN OPTICAL BENCH

FIELD AND BACKGROUND OF THE INVENTION

The present invention relates to augmented reality displays and, in particular, provides a head-mounted augmented reality device employing an optical bench to achieve and preserve alignment of the optical modules.

Augmented reality, also referred to as mixed reality, is a technology that allows virtual imagery to be mixed with a user's view of the real world. In addition to making the physical properties (e.g. shape, color, size, texture) of virtual objects realistic in a display, it is desired that their position and movement with respect to real objects display realistically. In order to enable such functionality in a head mounted device, additional sensors such as cameras and orientation sensors may be mounted alongside compact optical modules which integrate the real and virtual imagery. Such compact optical elements serve as both an imaging lens and a combiner, in which a two-dimensional display is imaged to infinity and reflected into the eye of an observer. Such optical modules typically include a collimating display source, which may be either an active illumination display or a light source illuminating a light-modulating display combined with collimating optics, and a light guide which receives a collimated image from the collimating display source and projects it into the eye of an observer.

The mechanical alignment and placement stability requirements between the collimating display source components and the light guide are stringent. Furthermore, the alignment and placement of the optical modules with respect to each other for binocular vision, as well as alignment with respect to any additional sensors and with respect to the observer, are subject to tight tolerances. Mechanical stress on the device, vibrations, shock, thermal fluctuations and thermal gradients may all lead to abrupt or gradual misalignment of the optical modules and other components, or damage to the modules.

SUMMARY OF THE INVENTION

The present invention is a head-mounted augmented reality device.

According to the teachings of an embodiment of the present invention there is provided, a head-mounted augmented reality device for displaying an augmented reality display to a user viewing a real scene, the device comprising: (a) a pair of optical modules including a right optical module for a right eye of the user and a left optical module for a left eye of the user, each of the optical modules comprising a collimating display source optically coupled to a light guide, the light guide being at least partially transparent and being configured to guide image illumination projected by the collimating display source to a coupling-out region, and to couple out at least some of the image illumination from the coupling-out region towards an eye of the user; (b) a support structure configured to engage a head of the user so as to be supported by the head of the user; and (c) an optical bench comprising: (i) a first set of alignment features for aligning and affixing the right optical module, (ii) a second set of alignment features for aligning and affixing the left optical module, and (iii) a suspension arrangement for suspending the optical bench relative to the support structure, wherein the optical bench provides the sole mechanical connection between the pair of optical modules and the support structure.

According to a further feature of an embodiment of the present invention, each of the first and second sets of alignment features comprises at least one planar alignment surface and at least two locating features for locating known reference locations of the optical module relative to the at least one planar alignment surface.

According to a further feature of an embodiment of the present invention, the at least two locating features are selected from the group consisting of: a pin for engaging an alignment aperture of the optical module, and an alignment aperture for receiving a pin.

According to a further feature of an embodiment of the present invention, the optical bench is further provided with a bolt hole for receiving a bolt for tightening each of the optical modules against each corresponding planar alignment surface.

According to a further feature of an embodiment of the present invention, the at least two locating features are configured to provide one degree of freedom for adjustment of an interpupillary distance between the coupling-out regions of the optical modules.

According to a further feature of an embodiment of the present invention, the at least one planar alignment surface for aligning the right optical module and the at least one planar alignment surface for aligning the left optical module are inclined relative to each other to define an angle of binocular convergence.

According to a further feature of an embodiment of the present invention, each of the first and second sets of alignment features comprises two planar alignment surfaces disposed bilaterally relative to the coupling-out region of a corresponding one of the optical modules.

According to a further feature of an embodiment of the present invention, the optical bench is formed as a unitary block of material.

According to a further feature of an embodiment of the present invention, the optical bench comprises a first closed-loop frame for rigidly supporting the right optical module and a second closed-loop frame for rigidly supporting the left optical module.

According to a further feature of an embodiment of the present invention, the optical bench further comprises camera alignment features for aligning at least one imaging device relative to the pair of optical modules.

According to a further feature of an embodiment of the present invention, the suspension arrangement comprises at least one elastomeric damping element deployed to inhibit passing of vibrations from the support structure to the optical bench.

According to a further feature of an embodiment of the present invention, the optical bench and the pair of optical modules together have an overall width, and wherein the suspension arrangement connects to the optical bench only within a central region of the width.

According to a further feature of an embodiment of the present invention, the support structure comprises a casing at least partially enclosing the optical bench, wherein the casing is spaced from the optical bench and from the pair of optical modules so as to avoid contact between the casing and both the optical bench and the pair of optical modules under a range of normal operating conditions.

According to a further feature of an embodiment of the present invention, at least part of the waveguides project downwards from the casing.

According to a further feature of an embodiment of the present invention, the support structure comprises a headband for encircling the head of the user.

According to a further feature of an embodiment of the present invention, the support structure has a pair of side arms deployed for engaging ears of the user.

BRIEF DESCRIPTION OF THE DRAWINGS

The invention is herein described, by way of example only, with reference to the accompanying drawings, wherein:

FIG. 2 is an isometric view of an optical module for use in the device of FIG. 1;

FIGS. 3A and 3B are back and front isometric views, respectively, of an optical bench for use in the device of FIG. 1;

FIG. 9A is an exploded isometric view illustrating a suspension arrangement for suspending the optical bench of FIG. 3A from a support structure, the suspension arrangement including a rotatable damping engagement;

FIG. 9B is a cross-sectional view taken through the rotatable damping engagement along a plane parallel to the axis of rotation;

FIG. 10 is a partial vertical cross-sectional view taken along a mid-plane of the device of FIG. 1 illustrating mounting of the optical bench via a suspension arrangement within a casing;

DESCRIPTION OF THE PREFERRED EMBODIMENTS

The present invention is a head-mounted augmented reality device.

The principles and operation of devices according to the present invention may be better understood with reference to the drawings and the accompanying description.

Figure 1:
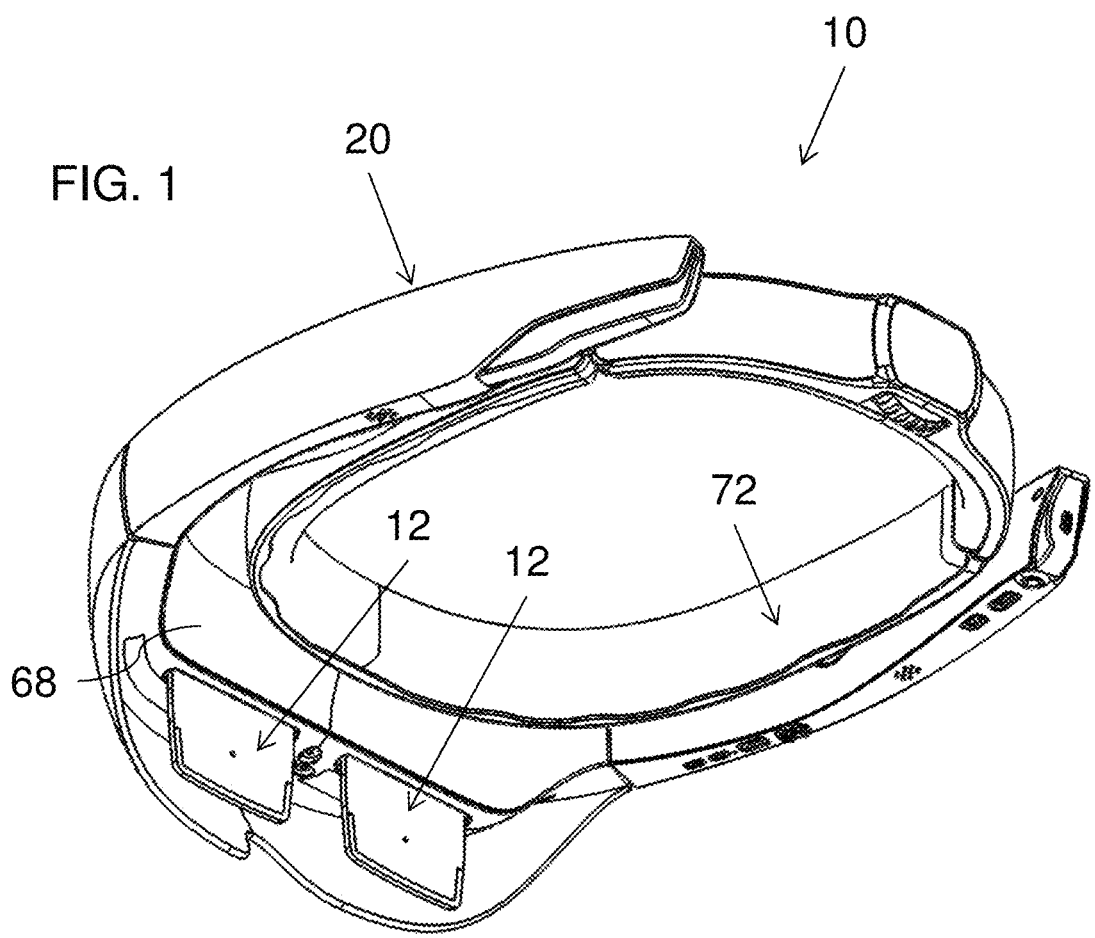
FIG. 1 is an isometric view of a head-mounted augmented reality device, constructed and operative according to an embodiment of the present invention.

Referring now to the drawings, FIGS. 1-14C illustrate various embodiments and various components of a head-mounted augmented reality device, generally designated 10, for displaying an augmented reality display to a user viewing a real scene. In general terms, device 10 includes a pair of optical modules 12, such as is illustrated in FIG. 1, including a right optical module for a right eye of the user and a left optical module for a left eye of the user. As best seen in FIG. 2, each optical module 12 includes a collimating display source 14 optically coupled to a light guide 16, which is at least partially transparent and is configured to guide image illumination projected by collimating display source 12 to a coupling-out region 18 where it couples out at least some of the image illumination from the coupling-out region towards an eye of the user.

The device also includes a support structure 20 configured to engage regions of a head of the user so as to be supported by the head of the user. It is a particular feature of one aspect of the present invention that device 10 includes an optical bench 22 which provides a first set of alignment features for aligning and affixing the right optical module, a second set of alignment features for aligning and affixing the left optical module, and a suspension arrangement for suspending the optical bench relative to the support structure. It is a particularly preferred feature of this aspect of the present invention that optical bench 22 provides the sole mechanical connection between the pair of optical modules 12 and support structure 20.

Use of an optical bench in this manner provides a number of advantages over direct mounting of the optical modules to the body-mounted support structure. Specifically, the optical bench preferably provides a relatively rigid interconnection between the optical modules, defining and maintaining accurate alignment between the two optical modules while at least partially isolating the optical modules from much of the stress, vibration and/or impact to which the body-mounted support structure may be exposed during normal use. The optical bench may also serve to define and maintain alignment between the optical modules and additional components, such as camera(s) and/or an inertial measurement unit (IMU), and similarly protect those elements from at least part of the mechanical and/or thermally-induced stresses to which the device may be exposed. The use of a dedicated optical bench, typically implemented using more rigid and/or more precisely machinable material than is used for the support structure, facilitates more precise alignment of the optical modules than could otherwise be achieved. These and other advantages of the various embodiments of the present invention will be better understood with reference to the further description below.

The optical modules 12 referred to herein may be any type of optical module which includes a collimated image projector, referred to herein as collimating display source 14, and an at least partially transparent combiner, referred to herein as light guide 16, for combining the projected image illumination with light from the real world to provide an augmented reality display. The collimating display source is typically based on an image generating element such as an OLED array or an illuminated LCOS array, combined with collimating optics, typically in a compact configuration based on polarized beam splitters (PBS). Most preferably, the optical modules provide a mechanism for optical aperture expansion to enable use of a miniature image projector while achieving a relatively larger angular field of view and "eyebox" of available eye motion over which the displayed image can be seen. Available technologies for achieving such optical aperture expansion include, as one particularly preferred but non-limiting example, the use of obliquely angled partially reflective surfaces within light guide 16, optionally in a two-stage expansion arrangement to achieve two dimensional aperture expansion, such as the various optical modules commercially available from Lumus Ltd. (Israel). Another aperture expansion technology commercially available from various sources employs diffractive optical elements to achieve coupling out of the image illumination from the light guide over an expanded area. It should be noted that the above are only examples, and that the present invention is applicable to any available technology which includes a display source and combiner to provide an augmented reality display. Details of the optical module design do not per se constitute part of the invention, and will therefore not be further discussed in this document.

Optical modules 12 for implementing the present invention may come in a number of different configurations and form-factors. FIGS. 1-13C herein illustrate configurations suitable for a "top-down" implementation, where the image illumination is directed into the light guide from the top edge of the light guide. It should be noted, however, that the invention is equally applicable to implementations in which the image illumination is introduced from a side, or from a corner, of the light guide. One such implementation will be discussed below with reference to FIGS. 14A-14C.

In the example illustrated in FIG. 1, mounting of the optical module 12 is achieved via two mounting regions 24 which are located on opposite sides of the collimating display source 14, and are thus disposed bilaterally relative to the coupling-out region 18 of the optical module. Spacing apart of the mounting regions in this manner tends to increase the precision of the alignment of the components.

Figure 4A:
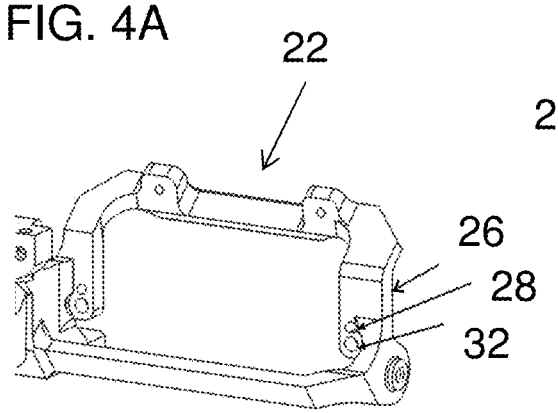
FIGS. 4A and 4B are partial isometric views illustrating part of the optical bench of FIG. 3A before and during, respectively, assembly of the optical module of FIG. 2 to the optical bench.
Figure 4B:
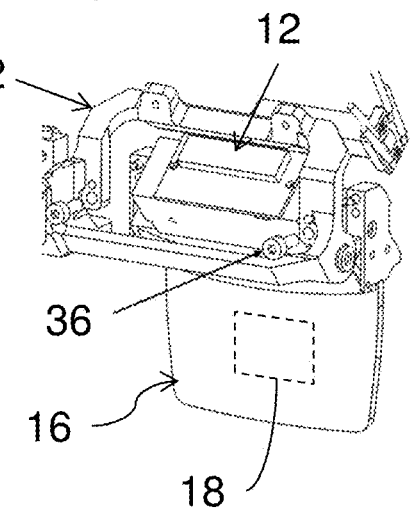
Figure 4C:
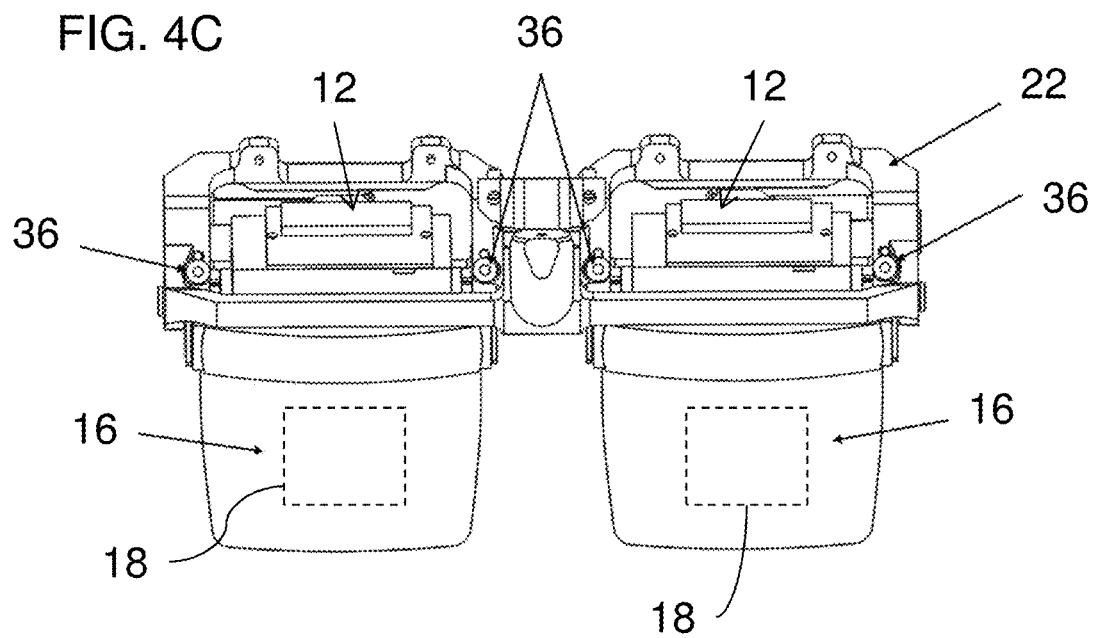
FIG. 4C is a front view of the assembly of the optical bench with two optical modules.
Figure 5:
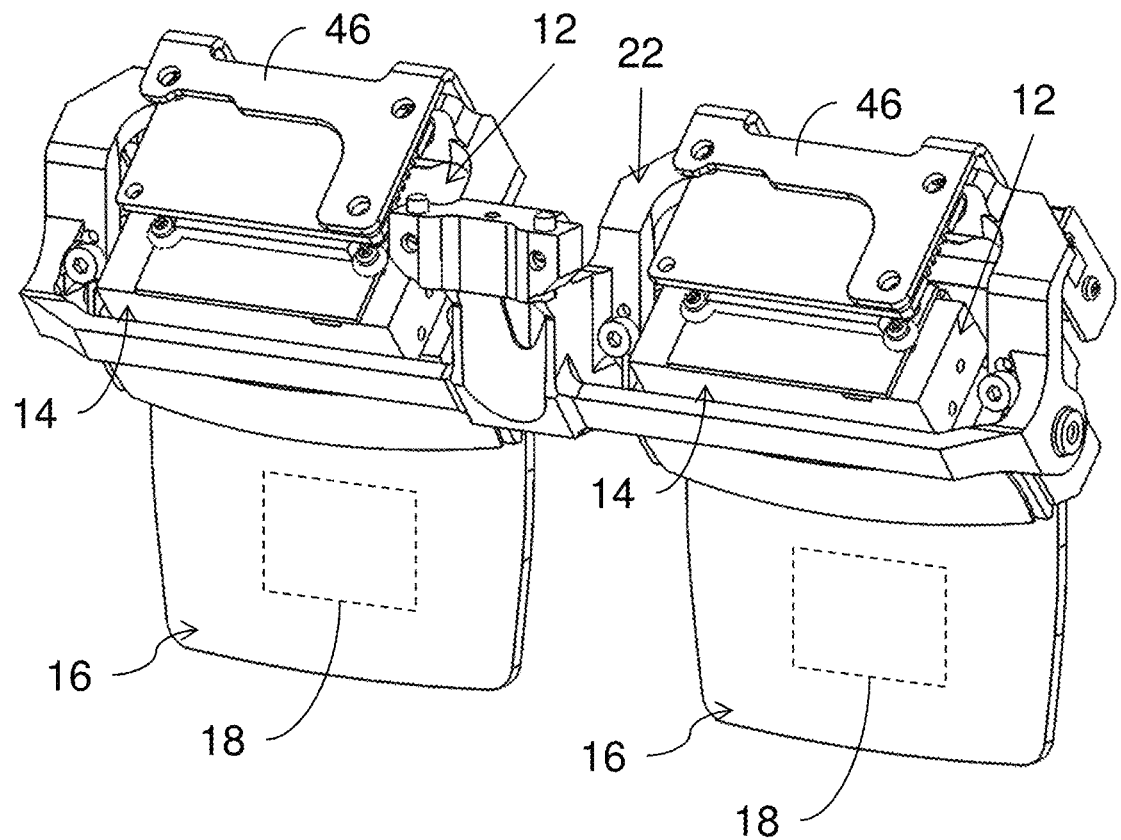
FIG. 5 is an isometric view of the assembly of FIG. 4C after attachment of additional driver circuitry to the assembly.

Each mounting region 24 defines a reference location formed with complementary features for alignment with a corresponding set of alignment features on optical bench 22. In the preferred example illustrated here, each set of alignment features of optical bench 22 includes at least one, and in this case two, planar alignment surfaces 26 and at least two locating features for locating known reference locations of optical module 12 relative to planar alignment surfaces 26. The at least two locating features are illustrated here as an alignment aperture 28 for receiving an alignment pin 30 which projects from a planar alignment surface of mounting region 24 of the optical module. Clearly, an equivalent effect could be achieved by providing an alignment pin projecting from alignment surface 26 and an alignment aperture in the planar surface of region 24, or two alignment apertures with a separate pin which engages both. Optical bench 22 is also provided with a bolt hole 32, typically also in the area of alignment surface 26, for receiving a bolt for tightening each of the optical modules against each corresponding planar alignment surface. Optical module 12 preferably has corresponding threaded bolt holes 34 so that, when the mounting regions 24 of optical module 12 are brought together with planar alignment surfaces 26 of optical bench 22, with alignment pins 30 engaged in alignment apertures 28, a pair of bolts 36 can be used to tighten the elements together, as illustrated in FIGS. 4, 5 and 7B.

It will be appreciated that the alignment features described thus far are effective to affix each optical module 12 to optical bench 22 with accurately defined orientation in 6 degrees of freedom (three linear/translational and three angular/rotational). Specifically, tightening of planar surface against a planar surface (surfaces 24 and 26) is sufficient to define two rotational orientations and one translational degree of freedom (perpendicular to the plane). Engagement of a first alignment pin with an alignment aperture then excludes two in-plane translational degrees of freedom, leaving only uncertainty regarding rotation about the pin as an axis. Engagement of a second alignment pin with an alignment aperture, spaced from the first engagement, thus fully defines the alignment in all 6 degrees of freedom. In order to reduce the need for highly precise spacing between the alignment apertures, the second alignment aperture may advantageously be implemented as an oval aperture or slot elongated in a direction towards/away from the first alignment aperture, which is still sufficient to fully determine the in-plane rotational orientation of the overall engagement.

Surfaces 24 and 26 are preferably accurate interface surfaces, which may be specially processed during manufacture to achieve an enhanced level of precision compared to other regions of these elements, for example, by employing a machining or grinding process to achieve high precision planar surfaces. By providing planar surfaces in two spaced-apart locations for each optical module, highly precise alignment precision can be achieved. It should be noted that the particular implementation of alignment features described here is merely exemplary, and that various configurations of alignment features may equally be used. Other examples include various combinations of alignment surfaces with ridges, slots or edge abutment features which align the optical modules by abutment with corresponding features on the optical module mounting regions 24.

The two planar alignment surfaces 26 for aligning each optical module 12 are preferably coplanar. The surfaces for aligning one optical module may also be coplanar with the surfaces for aligning the other optical module, in which case the optical axes of the two displays may either be parallel or a slight convergence may be introduced either digitally or in the alignment of the optical components. However, in certain particularly preferred implementations, the alignment surfaces 26 for aligning the right optical module 12 are inclined relative to the alignment surfaces for aligning the left optical module to define an angle of binocular convergence. For example, in one particularly preferred implementation, the alignment surfaces for each optical module are inclined by 0.45 degrees to a reference plane to give an angle of 179.1 degrees between the alignment surfaces, corresponding to binocular convergence at about 4 meters from the user. The extent of binocular convergence desired may vary according to the intended application, typically corresponding to the real-world working range onto which the augmented reality display is to be superimposed. For example, outdoor applications may employ a more distant point of convergence, typically in the 6-10 meter range, while AR-assisted surgical applications may employ a shorter convergence geometry, typically in the 0.4-1 meter range. (It is noted that the convergence distance is also a function of the inter-pupillary distance (IPD), as defined by simple trigonometry, with the ratio of half of the IPD to the convergence length equal to the tangent of the inclination angle of each optical module to the reference plane. However, for the purpose of determining a desired inclination angle, an average value for IPD gives sufficient accuracy.)

Turning now to other features of optical bench 22, the optical bench may advantageously be formed as a unitary block of material, which tends to enhance its rigidity and structural strength for a given weight. Suitable materials for optical bench 22 include, but are not limited to, various metals or metal alloys, such as aluminum, and fiber-reinforced polymers such as carbon composite materials. The design and dimensions of the optical bench, as well as the relevant manufacturing processes, will be adjusted according to the properties of the chosen material, as will be clear to a person having ordinary skill in the art.

Figure 12A:
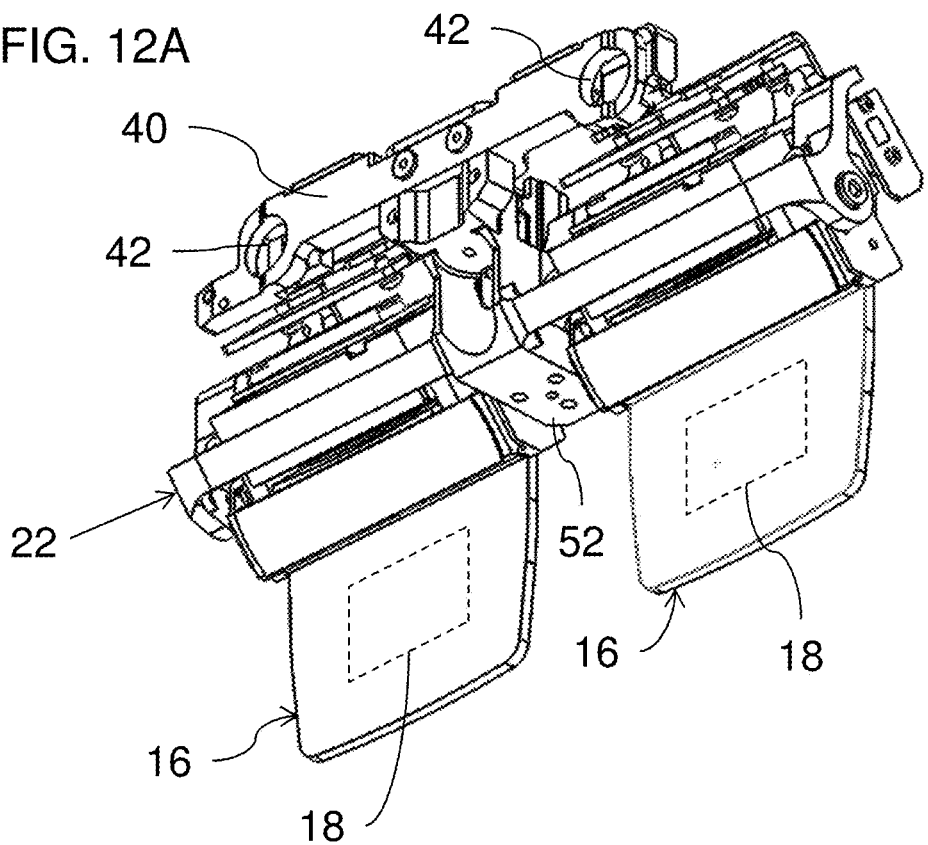
FIGS. 12A and 12B are an assembled and an exploded isometric view, respectively, of an assembly of the optical modules and optical bench of FIG. 4C together with additional components that are mounted on the optical bench.
Figure 12B:
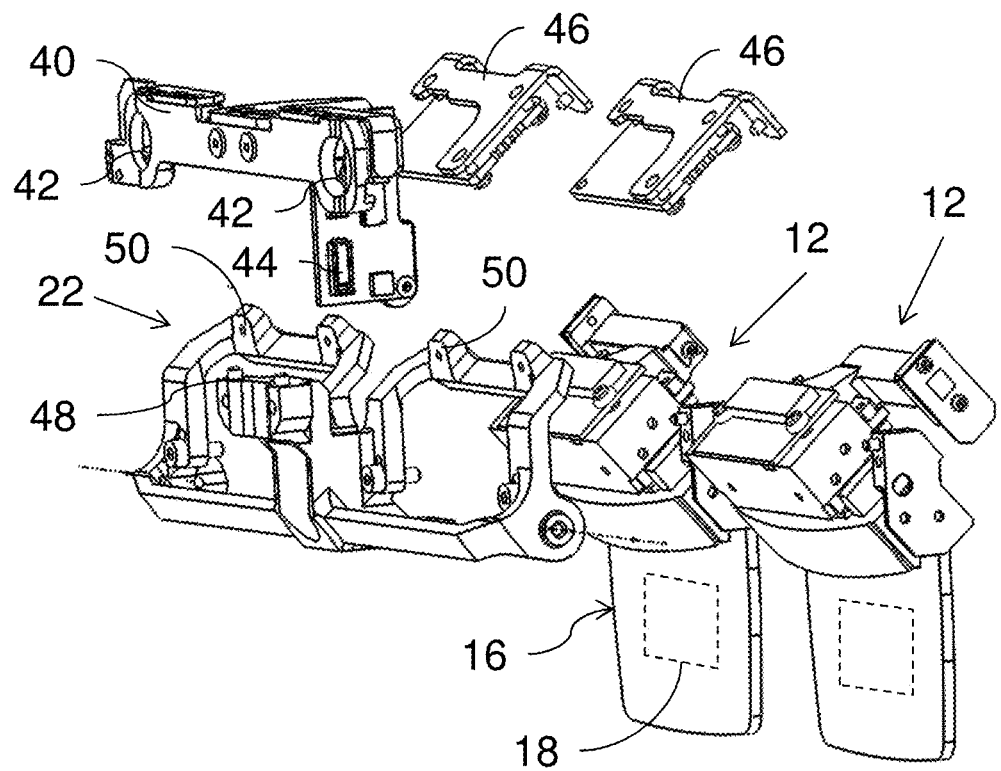

The structure and material are chosen in order to provide a substantially rigid interconnection between the optical modules 12. In this context, "substantially rigid" is used to refer to a structure which maintains alignment of the optical modules over a range of mechanical operating conditions to which a body-mounted device is normally exposed, which includes the linear and angular accelerations performed by the human head and/or body during movement, and bearing in mind the weight of the modules themselves. As best seen in FIGS. 12A and 12B, optical bench 22 may also be required to support a number of different components for which accurate alignment with the optical modules is critical and/or for which close proximity to the optical modules is advantageous. In the example of FIGS. 12A-12B, this includes a camera assembly 40 including a stereo pair of cameras 42, an IMU 44, and driver circuitry 46 for the optical modules 12. Each of these elements is typically provided with a dedicated attachment configuration in the structure of optical bench, such as a front bracket 48 providing camera alignment features for mounting camera assembly 40 (which is here integrated with the IMU 44) and top brackets 50 for attachment of driver circuitry 46. The positioning and weight of these components impose further mechanical requirements on the design of optical bench 22.

Certain structural features may be used to achieve enhanced rigidity of optical bench 22 for a given weight and choice of material. According to one preferred option, optical bench 22 employs at least one closed-loop structure, and most preferably a first closed-loop frame for rigidly supporting the right optical module and a second closed-loop frame for rigidly supporting the left optical module, as seen in FIGS. 3A-5.

Figure 6:
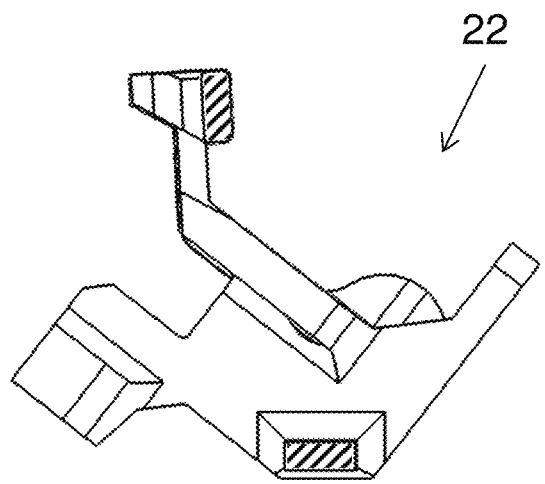
FIG. 6 is a cross-sectional view taken through the optical bench of FIG. 3A along a vertical plane through the center of a closed loop of the optical bench.

In the case of such a closed-loop structure, certain implementations of the present invention achieve enhanced multi-axis stiffness by using cross-beams with asymmetric stiffness, where the directions of maximal stiffness are non-parallel. This option is best illustrated in FIG. 6, where the vertical cross-sectional view cuts through the two cross-beams of one of the closed loops (the shaded areas). Each cross-beam has a cross-section which has a long axis and a short axis, in this case, the long side and the short side of a rectangular cross-section. The long axis of the lower cross-beam is significantly non-parallel (more than 45°), and preferably roughly perpendicular (90°±15°) to the long axis of the upper cross-beam cross-section, thereby providing enhanced resistance to bending moments in different directions.

Figure 13A:
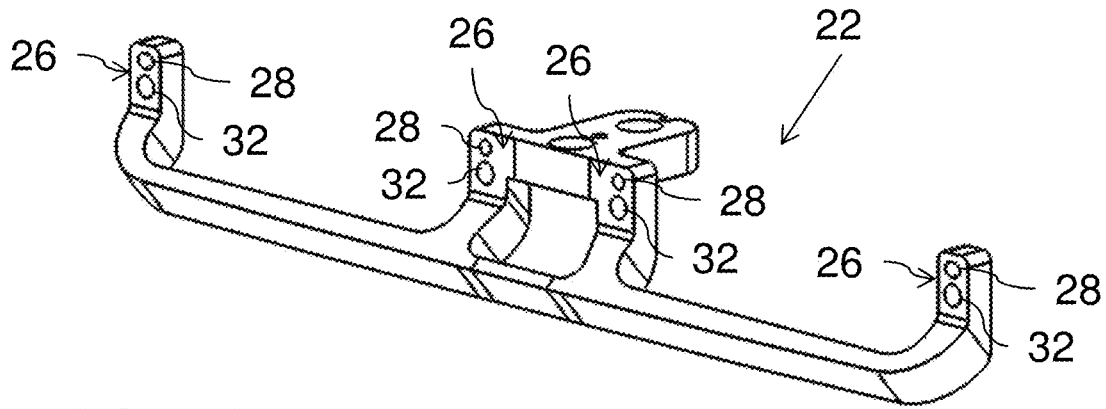
FIGS. 13A and 13B are front and back isometric views, respectively, of an alternative implementation of an optical bench for use in an alternative implementation of the present invention.
Figure 13B:
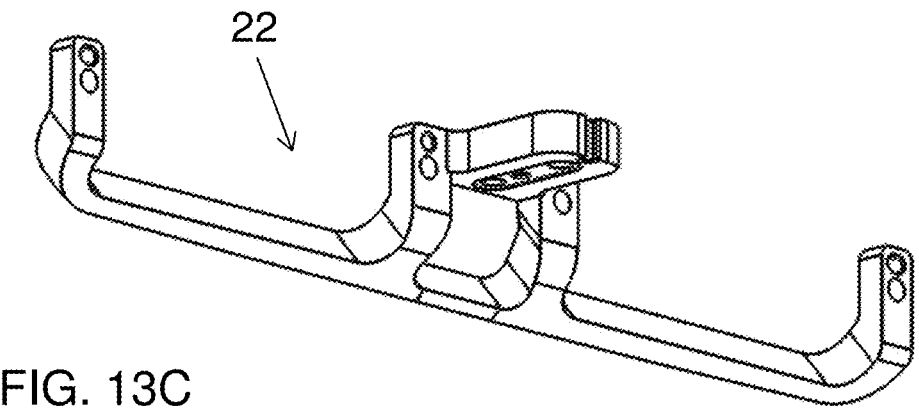
Figure 13C:
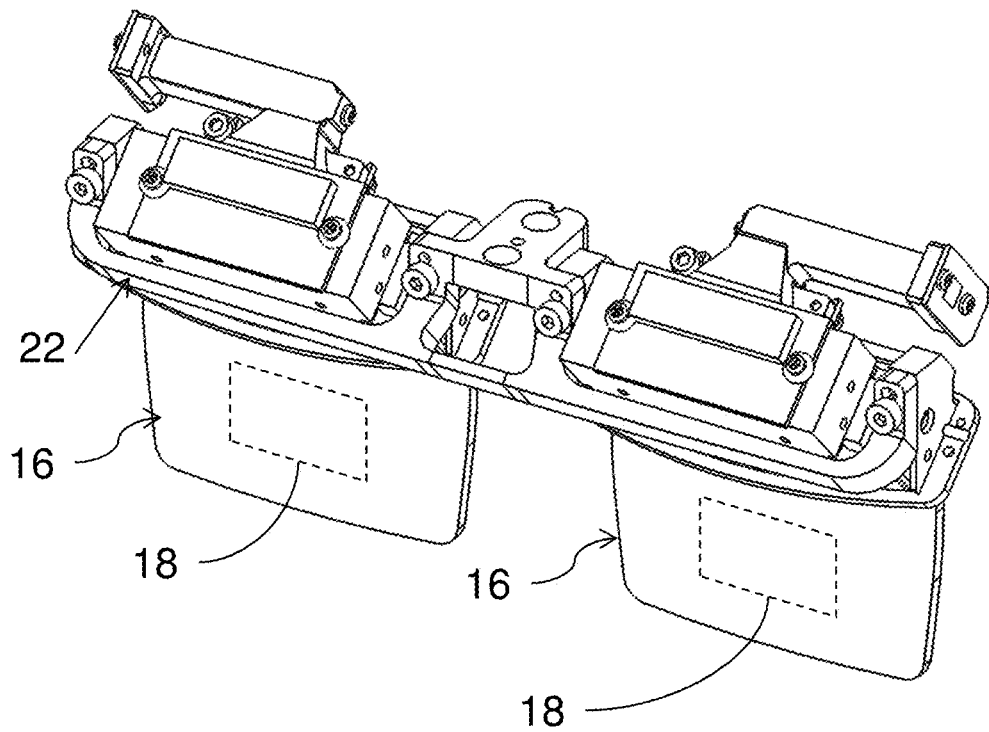
FIG. 13C is an isometric view of an assembly of the optical bench of FIG. 13A with the optical modules of FIG. 2.

Although the illustrated closed-loop configuration for optical bench 22 is believed to be advantageous for a range of implementations, it should be noted that the invention is not limited to such implementations, and that, particularly where fewer additional components need to be mounted on the bench, a reduced implementation may be sufficient. FIGS. 13A-13C illustrate a reduced version of optical bench 22 used to support a pair of optical modules 12 according to an alternative implementation of the present invention. The details of the optical bench design may be varied for each particular application according to the specific combination of components to be supported and the available space according to the desired form factor of the final device.

Figure 7A:
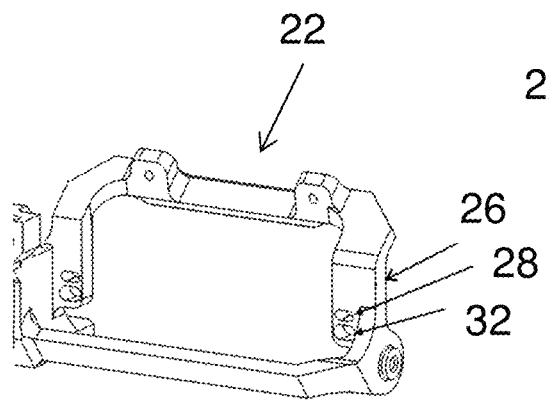
FIGS. 7A and 7B are views similar to FIGS. 4A and 4B illustrating a variant implementation allowing interpupillary distance adjustment between the optical modules.
Figure 7B:
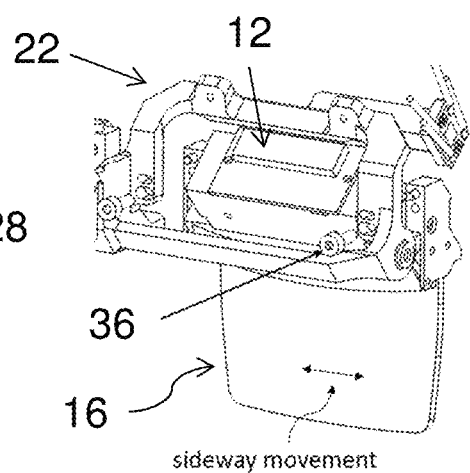
Figure 8:
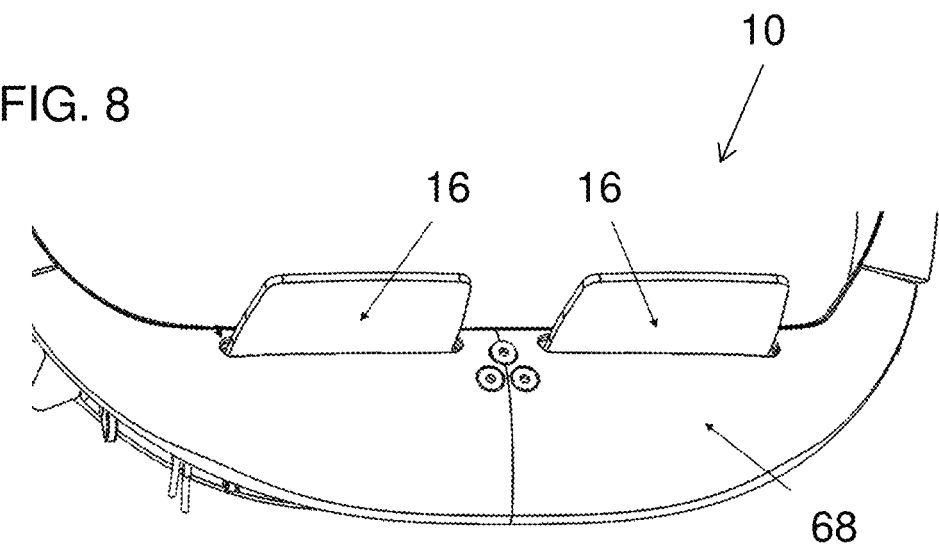
FIG. 8 is a partial isometric view from beneath the device of FIG. 1 illustrating a spacing around the optical modules to accommodate adjustment of interpupillary distance.

Turning now to FIGS. 7A-7B and 8, according to certain preferred implementations of the present invention, the attachment position of optical modules 12 to optical bench 22 may be adjustable to accommodate different interpupillary distances (IPD). It will be noted that the AR displays of the present invention are typically insensitive to variations in IPD, so long as the eye motion box of the user does not take the field of view of the user outside the coupling-out region 18 from which the display image illumination is projected. However, adjustability of the IPD may allow the use of a relatively smaller coupling-out region, and consequently a reduced overall size of the projection system.

One particularly preferred option for adjusting IPD is illustrated in FIG. 7A, where alignment aperture 28 and bolt hole 32 are formed as slots elongated in the horizontal direction. This relaxes one degree of freedom for horizontal translation of the optical module over a predefined range of motion. The image projection of optical module 12 is generally insensitive to in-plane translation without rotation, so long as the limits of the display area are not reached, so this adjustment does not impact the display. A range of a few millimeters in either direction for each of the two eyes is typically enough to adjust an IPD between the (centers of) the coupling out regions 18, to accommodate IPD variations for a majority of the population, and allows a corresponding reduction in the size of the coupling-out region 18. Optionally, the horizontal position of each optical module may be fixed, as before, by tightening of bolts 36 which clamp the modules in place by frictional contact. More preferably, spring washers, or some other resilient element, may be provided to provide frictional retention of the position of each optical module, but allowing lateral displacement of the optical module by the user simply by applying gentle manual force to overcome the frictional retention. The alignment features of the optical bench reliably maintain the desired alignment of the optical modules in angular orientation about all axes and in two linear dimensions, thereby accommodating convenient IPD adjustment without requiring complex displacement mechanisms. As illustrated in FIG. 8, any parts of support structure 20 that are adjacent to any part of the optical modules are implemented with sufficient clearance to accommodate the available range of adjustment for the optical module position.

Turning now to the suspension arrangement for suspending optical bench 22 relative to support structure 20, this may take many different forms according to the details of the particular application and the form-factor of the support structure. In one subset of particularly preferred implementations, the suspension arrangement connects to the optical bench only within a central region of the width, defined as within a central 20 percent, of the overall width of the assembly of optical bench 22 with optical modules 12. Most preferably, the connection is limited to within the central 10 percent of the overall width, which can be achieved, for example, by attaching optical bench 22 to the support structure only via a central attachment surface 52 (FIG. 12A). Attachment may be rigid, but is more preferably via at least one elastomeric damping element deployed to inhibit (attenuate) transmission of vibrations from the support structure to optical bench 22. By supporting optical bench 22 only in a central region, transfer of stress from the support structure to the optical bench is substantially eliminated, allowing the support structure to bend, twist and/or undergo thermal expansion or contraction without introducing corresponding deformations or stresses to the optical assembly.

In other implementations, a more sophisticated suspension arrangement may be provided which maintains alignment of optical bench 22 relative to support structure 20 while more effectively attenuating vibrations between the elements. An example of such a suspension arrangement is illustrated with reference to FIGS. 9A-11B.

Figure 11A:
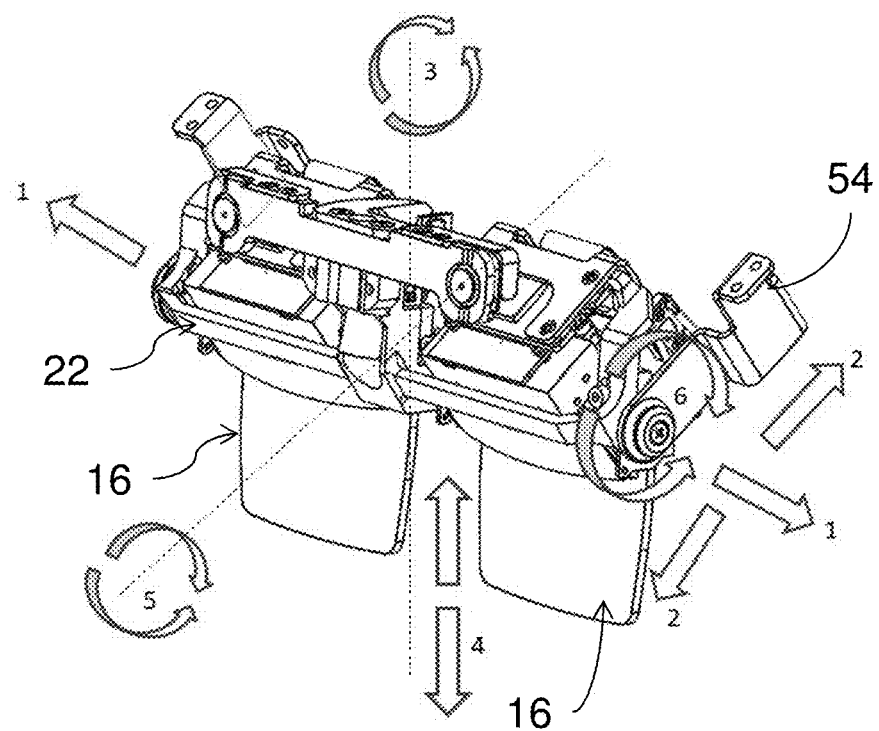
FIG. 11A is a schematic isometric illustration of the optical bench assembly mounted via the suspension arrangement showing the various directions of linear and rotational motion for which the suspension arrangement provides location and damping.
Figure 11B:
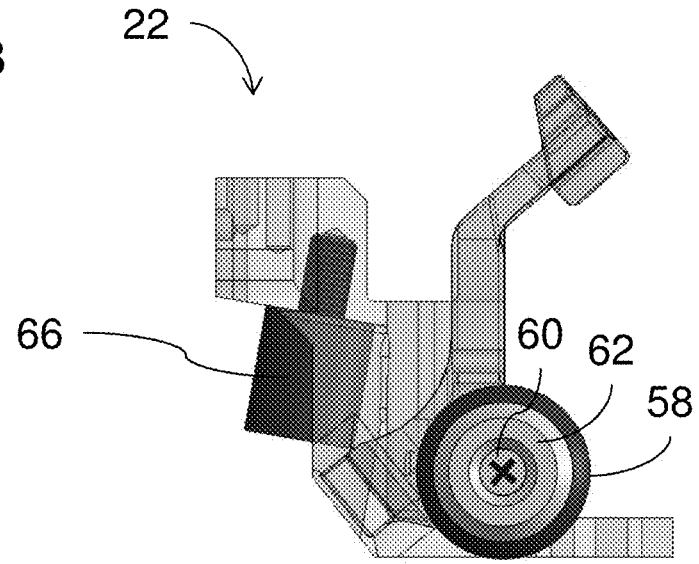
FIG. 11B is a schematic side view illustrating the relative positioning of the various damping elements of the suspension arrangement.

Referring first to FIG. 9A, the support structure (not shown) is here provided with two side brackets 54 terminating at apertures 56 within which elastomeric grommets 58 are positioned. A bolt 60 and washer 62 pass through a central bore of each grommet 58 and engage a threaded aperture 64 on each side of optical bench 22. The assembled connection is illustrated in cross-section in FIG. 9B. This bilateral attachment to side brackets 54 suspends optical bench 22 in a well-defined position relative to five out of the six degrees of freedom illustrated in FIG. 11A, namely, three axes of linear displacement and two axes of rotation. This leaves only the rotation axis labeled "6" in FIG. 11A, corresponding to rotation about the common axis of bolts 60. This last degree of rotational freedom is cancelled by a damping connector 66 which is attached off-axis relative to bolts 60 near the center of the optical bench, and is connected via another bracket (not shown) to the support structure, thereby forming a damped connection between optical bench 22 and the support structure. This geometry is best seen in FIG. 11B. It is a particular feature of certain implementations of the present invention that threaded apertures 56 are located so that the assembly of optical bench 22 with the other components that are mounted thereon has a center of mass that lies substantially on an axis between threaded apertures 56. This ensures that any impact or vibration transferred to the assembly via this support structure does not give rise to a net moment, which could lead to further oscillatory motion.

Although the above suspension arrangement provides support for the optical bench in three spaced-apart locations, each interconnection occurs through an elastomeric damping element which has the ability to attenuate impacts and vibrations, and to deform under conditions of stress (such as through differentials in thermal expansion coefficients) so as to avoid conveying significant stress to the optical bench. The elastomeric elements also contribute to thermal isolation of the optical bench and associated optical components.

In certain particularly preferred implementations of the present invention, support structure 20 includes a casing 68 at least partially enclosing optical bench 22, as best seen in FIG. 10. In this case, casing 68 is preferably spaced from optical bench 22 and from optical modules 12 by a minimum gap 70 so as to avoid contact between the casing and both the optical bench and the pair of optical modules under a range of normal operating conditions. The "range of normal operating conditions" in this context relates to conditions of vibration, mechanical stress, and operating temperature range over which the product is typically required to operate, as defined by various standards and as known in the art. Primarily, the gap should be sufficient that, if the device is dropped from a height of up to at least 1 meter onto a hard surface, the gap is not closed, and the impulse of the impact is conveyed to the optical bench only through the elastomeric damping elements.

As illustrated herein, the option of a casing which at least partially encloses the optical bench and various electronic and/or optical components of the device may advantageously be implemented in a "top-down" design, where the image illumination is introduced at the top of the light guide 16 and propagates downwards within the light guide. In this case, at least part of the waveguides 16 of optical modules 12 preferably project downwards from casing 68, as seen in FIGS. 1 and 8.

As mentioned above, optical bench 22 preferably provides the sole mechanical connection between the pair of optical modules 12 and support structure 20. In this context, the phrase "mechanical connection" is used to refer to any connection between two elements which is intended to bear load and convey forces between the elements. It will be noted that there are typically various flexible electrical cables which pass between the support structure and the optical modules, providing power and video signals etc. Although these flexible cables may convey some small force between the elements, any such forces are unintended, intentionally minimized, and are negligible compared to the mechanical connections which support the structures. As such, the term "sole mechanical connection" does not exclude such interconnections that are not intended to be load bearing.

Support structure 20 may be implemented in a wide range of configurations corresponding to different "form factors" of the device. In one non-limiting option, as illustrated in FIG. 1, support structure 20 includes a headband 72, preferably adjustable, for encircling the head of the user. This provides a stable platform for the device, and is particularly suitable for use in situations where the user is highly active while using the device. A similar configuration can be implemented as a helmet-mounted display where support structure 20 is integrated with a helmet.

An alternative "form factor" employs a glass-frame type device, in which support structure 20 includes a pair of side arms deployed for engaging ears of the user (not shown). In this case, a third point of support, for engaging the user's nose, may extend downwards either from the support structure 20 or, in some cases, directly from the optical bench 22. Although in most implementations of the present invention, it is considered preferably that the optical bench does not directly interface with the user's body, one region of central support, particularly when implemented as a resilient or padded bridge for engaging the nose, may be acceptable in certain implementations.

Figure 14A:
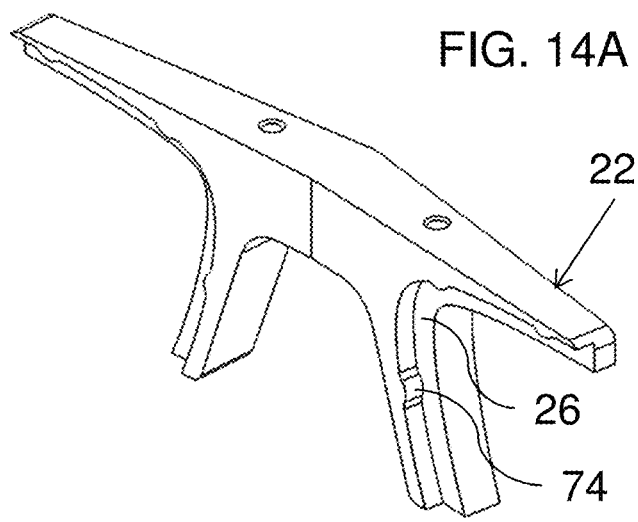
FIGS. 14A and 14B are two rear isometric views of an alternative implementation of an optical bench for use in an alternative implementation of the present invention.
Figure 14B:
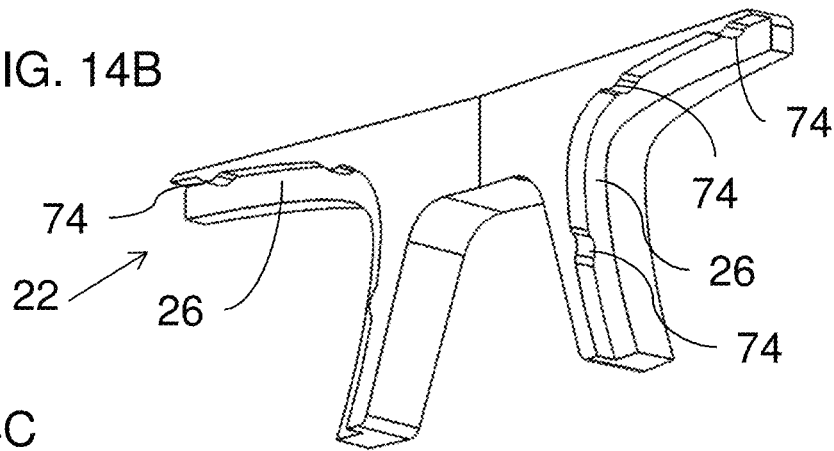
Figure 14C:
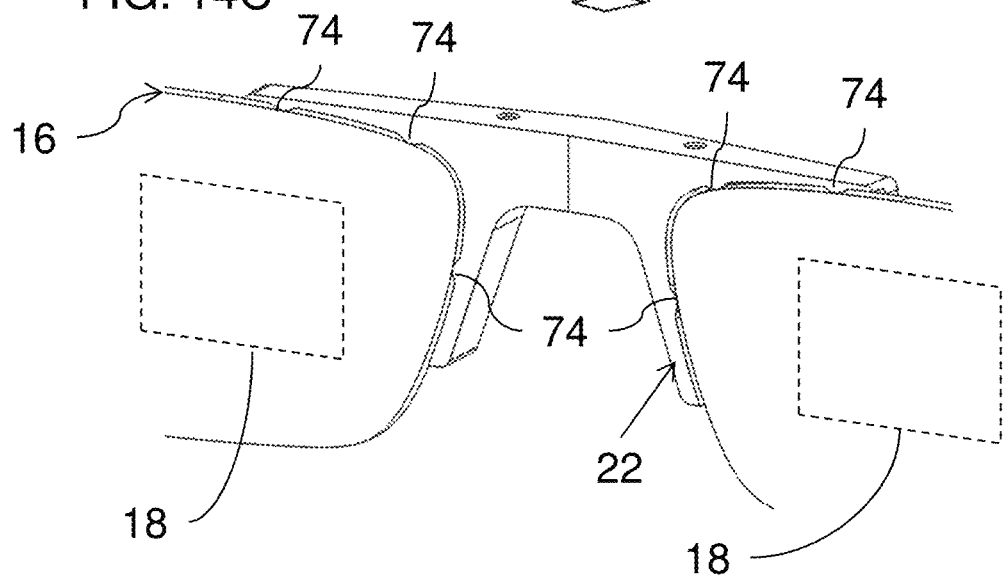
FIG. 14C is a partial isometric view of an assembly of the optical bench of FIG. 14A with two optical modules to form an alternative implementation of a device according to an embodiment of the present invention.

Turning finally to FIGS. 14A-14C, although the invention has been illustrated thus far with reference to a top-down optical module implementation, it can equally be implemented using other configurations which, in some cases, may provide additional advantages. By way of example, FIGS. 14A and 14B illustrate an optical bench 22 implemented as a central block for linking between two light guides 16, as seen in FIG. 14C, for a side-injected image implementation, where the collimating display source (not shown) is located at the lateral edge of each light guide. This implementation also illustrates an alternative implementation of the alignment features for aligning and affixing each optical module. In this case, an alignment surface 26 is provided for abutment directly to a surface of the light guide 16, and lateral abutment features 74, here implemented as localized projections. The use of three lateral abutment features abutting a non-linear and non-circular edge of light guide 16 is sufficient to define a unique position and alignment of the light guide relative to the optical bench. Attachment of light guide 16 to the optical bench 22 is here preferably achieved by use of adhesive, in a thin layer between the light guide and alignment surface 26 and/or in a space between the light guide and the optical bench between and/or around the lateral abutment features. The use of adhesive is not limited to this embodiment, and may also be implemented in the context of the other embodiments described above.

It will be appreciated that the above descriptions are intended only to serve as examples, and that many other embodiments are possible within the scope of the present invention as defined in the appended claims.

What is claimed is:

1. A head-mounted augmented reality device for displaying an augmented reality display to a user viewing a real scene, the device comprising:
    (a) a pair of optical modules including a right optical module for a right eye of the user and a left optical module of a left eye of the user, each of said optical modules comprising a collimating display source optically coupled to a light guide, said light guide being at least partially transparent to allow direct viewing of the real scene by the user through said light guide and being configured to guide image illumination projected by said collimating display source to a coupling-out region, and to couple out at least some of said image illumination from said coupling-out region towards an eye of the user;
    (b) a support structure configured to engage a head of the user so as to be supported by the head of the user; and
    (c) an optical bench comprising:
        (i) a first set of alignment features for aligning and affixing said right optical module,
        (ii) a second set of alignment features for aligning and affixing said left optical module, and
        (iii) a suspension arrangement for suspending said optical bench relative to said support structure,
wherein said support structure has a pair of side arms deployed for engaging ears of the user and the device has a glasses-frame configuration supported primarily by the ears of the user and a nose of the user,
and wherein each of said first and second sets of alignment features comprises at least one planar alignment surface and at least two locating features for locating known reference locations of said optical module relative to said at least one planar alignment surface, and wherein said at least one planar alignment surface for aligning said right optical module and said at least one planar alignment surface for aligning said left optical module are inclined relative to each other to define an angle of binocular convergence,
and wherein said optical bench provides the sole mechanical connection between said pair of optical modules and said support structure.

2. The device of claim 1, wherein said at least two locating features are selected from the group consisting of: a pin for engaging an alignment aperture of said optical module, and an alignment aperture for receiving a pin.

3. The device of claim 2, wherein said optical bench is further provided with a bolt hole for receiving a bolt for tightening each of said optical modules against each corresponding planar alignment surface.

4. The device of claim 1, wherein said at least two locating features are configured to provide one degree of freedom for adjustment of an interpupillary distance between said coupling-out regions of said optical modules.

5. The device of claim 1, wherein each of said first and second sets of alignment features comprises two planar alignment surfaces disposed bilaterally relative to said coupling-out region of a corresponding one of said optical modules.

6. The device of claim 1, wherein said optical bench is formed as a unitary block of material.

7. The device of claim 1, wherein said optical bench comprises a first closed-loop frame for rigidly supporting said right optical module and a second closed-loop frame for rigidly supporting said left optical module.

8. The device of claim 1, wherein said optical bench further comprises camera alignment features for aligning at least one imaging device relative to said pair of optical modules.

9. The device of claim 1, wherein said suspension arrangement comprises at least one elastomeric damping element deployed to inhibit passing of vibrations from said support structure to said optical bench.

10. The device of claim 1, wherein said optical bench and said pair of optical modules together have an overall width, and wherein said suspension arrangement connects to said optical bench only within a central region of said width.

11. The device of claim 1, wherein said support structure comprises a casing at least partially enclosing said optical bench, wherein said casing is spaced from said optical bench and from said pair of optical modules so as to avoid contact between said casing and both said optical bench and said pair of optical modules under a range of normal operating conditions.

12. The device of claim 11, wherein at least part of said waveguides project downwards from said casing.

13. A head-mounted augmented reality device for displaying an augmented reality display to a user viewing a real scene, the device comprising:
    (a) a pair of optical modules including a right optical module for a right eye of the user and a left optical module of a left eye of the user, each of said optical modules comprising a collimating display source optically coupled to a light guide, said light guide being at least partially transparent and being configured to guide image illumination projected by said collimating display source to a coupling-out region, and to couple out at least some of said image illumination from said coupling-out region towards an eye of the user;
    (b) a support structure configured to engage a head of the user so as to be supported by the head of the user; and
    (c) an optical bench comprising:
        (i) a first set of alignment features for aligning and affixing said right optical module,
        (ii) a second set of alignment features for aligning and affixing said left optical module, and
        (iii) a suspension arrangement for suspending said optical bench relative to said support structure,
wherein each of said first and second sets of alignment features comprises at least one planar alignment surface and at least two locating features for locating known reference locations of said optical module relative to said at least one planar alignment surface, and wherein said at least one planar alignment surface for aligning said right optical module and said at least one planar alignment surface for aligning said left optical module are inclined relative to each other to define an angle of binocular convergence, and wherein said optical bench provides the sole mechanical connection between said pair of optical modules and said support structure.

\* \* \* \* \*